(No Model.)
G. VAN WINKLE.
MEANS FOR MAKING DOOR KNOBS.
No. 373,572. Patented Nov. 22, 1887.
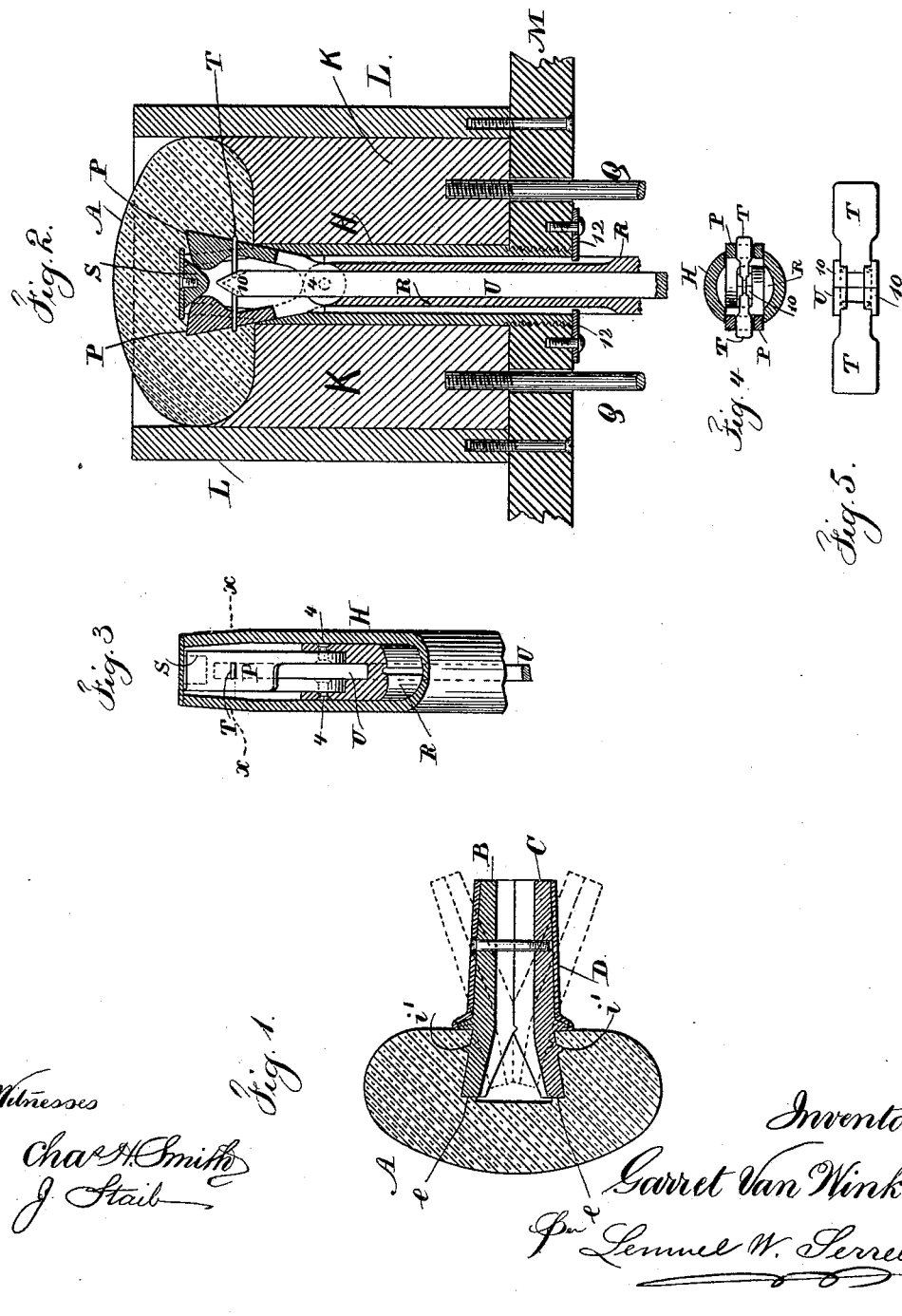

UNITED STATES PATENT OFFICE.

GARRET VAN WINKLE, OF NORTH PLAINFIELD, NEW JERSEY.

MEANS FOR MAKING DOOR-KNOBS.

SPECIFICATION forming part of Letters Patent No. 373,572, dated November 22, 1887.

Application filed March 18, 1887. Serial No. 231,379. (No model.) Patented in England June 23, 1885, No. 7,655.

*To all whom it may concern:*

Be it known that I, GARRET VAN WINKLE, of North Plainfield, in the county of Union and State of New Jersey, have invented an Improvement in Means for Making Door-Knobs, of which the following is a specification.

This invention relates to the mechanism for pressing the door-knob and forming the dovetailed recesses in the cavity of the knob for the reception of the two-part shank shown in Letters Patent No. 320,602, granted to me June 23, 1885.

The present mechanism is shown in Letters Patent No. 7,655, granted to me in Great Britain June 23, 1885.

In making the knob, the recess is formed by a plug within which is a plunger having two claws or pawls passing at an inclination through openings in the sides of the plug, so that the cavity with the undercut or dovetailed recesses will be formed when the knob is pressed up in the mold, and by moving the plunger endwise the claw-pieces will be withdrawn into the plug before removing the plug from the cavity in the knob.

In the drawings, Figure 1 is a section of the knob and shank complete, as in my aforesaid patent. Fig. 2 is a vertical section of part of the apparatus for making the knob. Fig. 3 is a detached view of the plunger separately and partly in section. Fig. 4 is a sectional plan at the line $x\,x$, Fig. 3, and Fig. 5 is a detached view in larger size of the secondary claw-pieces and their actuating-rod.

The knob A, when formed of clay or other material, is pressed in any suitable mold, and it is recessed for the shank by a plug, H, that may slide through the base-block K within the mold L; or, preferably, the mold L and plug H are connected to the base M and the knob is removed after the claws P have been withdrawn by lifting the block K by the rods Q, to which a lever is applied. The plug H is hollow or tubular, and there are lateral openings in it at opposite sides, through which project the claws P, that form the dovetail recesses for the ends $e$ of the shank B C. These claws P are united to the follower-rod R by joint-pins 4, (see Fig. 3,) so that they are free to swing inwardly when the rod R is drawn down, thereby drawing the claws into the plug before the knob is removed. These claws are again projected ready for another knob to be formed around them. This is done by raising the rod R so that the inclined inner parts of the claws come against the central inclined stop, S, at the end of the plug.

When the ribs $i'$ upon the shanks $e$ are made use of, as shown in my Patent No. 349,915, I employ secondary claws, T, to imprint the walls of the cavity in the knob for the reception of the said ribs $i'$. In this case the rod R is tubular, with a second rod, U, within it having a double end, 10, and the secondary claws T pass through mortises in the claws P. These stationary claws T can be projected by the double-inclined end 10 of the rod U; but as these secondary claws T have to be drawn in before the claws P are moved I make the inclined end 10 with dovetail grooves to receive the similarly-shaped ends of the secondary claws T, as seen in larger size in Fig. 5, so that the secondary claws T are withdrawn by drawing down the rod U, and then the claws P are drawn into the plug by moving down the tubular rod R, as aforesaid, and the pressed knob is raised off the plug H by lifting the block K. The guide-fingers 12 are fastened to the base-plate M, and their ends enter longitudinal grooves in the exterior surfaces of the tubular rod R. These fingers keep the parts in their proper relative positions, and also free the grooves of particles of clay or other foreign substances. When the projecting ends $e$ are rounding upon their exterior surfaces, as shown in my Patent No. 349,915, then the surfaces of the claws P are to be similarly shaped.

I claim as my invention—

1. The combination, with the mold for pressing mineral knobs, of the plug H and the claws P, that are received into mortises in the plug, and a rod to which the claws are hinged, so as to be drawn into the plug before the latter is removed from the knob, substantially as set forth.

2. The combination, with the mold for pressing mineral knobs, of the plug H, the claws P, received into mortises in the plug, the tubular rod R, to which the claws are hinged, the rod U, and the secondary claws T, substantially as set forth.

3. The combination, in a mold for pressing mineral knobs, of the lifting-block K, the rods Q, for lifting the block, the tubular plug H, the base M, to which the same is attached, the claws P in mortises in the plug H, and the rod R, to which the claws are joined and by which they are moved, substantially as specified.

Signed by me this 15th day of March, 1887.

GARRET VAN WINKLE.

Witnesses:
   GEO. T. PINCKNEY,
   WILLIAM G. MOTT.